April 16, 1963  C. M. RIVELY ET AL  3,085,685
LAMP-INSPECTION APPARATUS
Filed Dec. 10, 1959  6 Sheets-Sheet 1

INVENTORS
CLAIR M. RIVELY and
WILLIAM PECHY.
BY
ATTORNEY

April 16, 1963  C. M. RIVELY ET AL  3,085,685
LAMP-INSPECTION APPARATUS
Filed Dec. 10, 1959  6 Sheets-Sheet 3

FIG. 4.

INVENTORS
CLAIR M. RIVELY and
WILLIAM PECHY.
BY
ATTORNEY

April 16, 1963 C. M. RIVELY ET AL 3,085,685
LAMP-INSPECTION APPARATUS
Filed Dec. 10, 1959 6 Sheets-Sheet 6

FIG. 14.

INVENTORS
*CLAIR M. RIVELY and
WILLIAM PECHY.*
BY
ATTORNEY

United States Patent Office 3,085,685
Patented Apr. 16, 1963

3,085,685
LAMP-INSPECTION APPARATUS
Clair M. Rively, Rockaway, and William Pechy, Manasquan, N.J., assignors to Westinghouse Electric Corporation, East Pittsburgh, Pa., a corporation of Pennsylvania
Filed Dec. 10, 1959, Ser. No. 858,774
11 Claims. (Cl. 209—75)

The present invention relates to apparatus for fabricating fluorescent lamps and, more particularly, to apparatus for automatically inspecting the electrical and mechanical properties of fluorescent lamps during their fabrication.

Heretofore, it has been the custom to provide a machine on which fabricating operations were performed on fluorescent lamps and thereafter the partially fabricated fluorescent lamps were transferred, either manually or by an automatic transfer means, to a second machine where additional fabricating operations were performed on the fluorescent lamps during their manufacture. This use of an operator or an automatic transfer means is expensive and in order to reduce overall manufacturing costs it is desirable to eliminate such operator or automatic transfer means.

Specifically, as an example of associated operations performed on fluorescent lamps during their fabrication, such fluorescent lamps were heretofore manually inspected for defects in their electrical and physical properties by an operator. Because of the difficulty in manipulating the elongated fluorescent lamps, and the operator judgment involved in the inspection process, and due to the required accuracy with which these electrical and mechanical measurements must be made, an automatic inspection machine for the inspection of the electrical and physical properties of such fluorescent lamps has been long needed. This has become even more imperative since the advent of higher speed operation of the associated sealing-in, exhausting and basing operations, has reduced the available inspection time to a point where a single operator can no longer efficiently inspect such fluorescent lamps. Further, the increasing scarcity of available factory space between successive fabricating machines makes it impossible to use several inspectors, which use would obviously be even more expensive and inefficient.

It is the general object of the present invention to avoid and overcome the foregoing and other difficulties of and objections to prior art practices by the provision of an automatic inspection machine for fluorescent lamps which will automatically inspect the electrical properties of such fluorescent lamps on one inspection conveyor and will then inspect the mechanical properties of such fluorescent lamps on a second inspection conveyor without the use of manual labor or intervening automatic transfer devices for transferring the lamps between the successive conveyors.

The aforesaid objects of the present invention, and other objects which will become apparent as the description proceeds, are achieved by providing lamp-inspection apparatus having a first lamp-inspection conveyor for receiving the fluorescent lamps and transporting them through a plurality or work stations where inspection operations are performed on such lamps, and a second lamp-inspection conveyor disposed in operative engagement with said first lamp-inspection conveyor to directly receive such partially inspected lamps by gravitation from said first lamp-inspection conveyor, the second lamp-inspection conveyor being operable to transport the partially inspected lamps through a second series of work stations where further inspection operations are performed thereon.

For a better understanding of the present invention reference should be had to the accompanying drawings, wherein like numerals of reference indicate similar parts throughout the several views and wherein.

Figure 3:
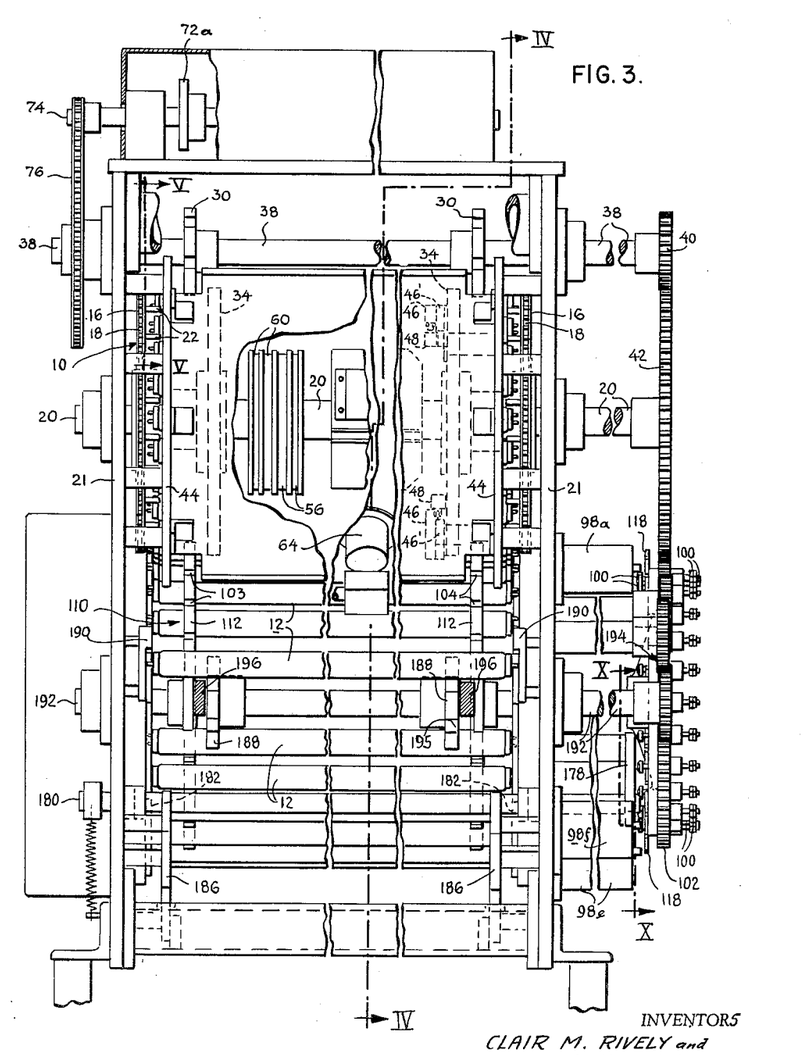
FIG. 3 is an elevational view of the discharge end of the automatic inspection machine shown in FIGS. 1 and 2 with portions thereof broken away to show the electrical commutating means and the mounting means for the electrical-inspection elements, which are diagrammatically shown in the left-hand portion of FIG. 14.
Figure 4:
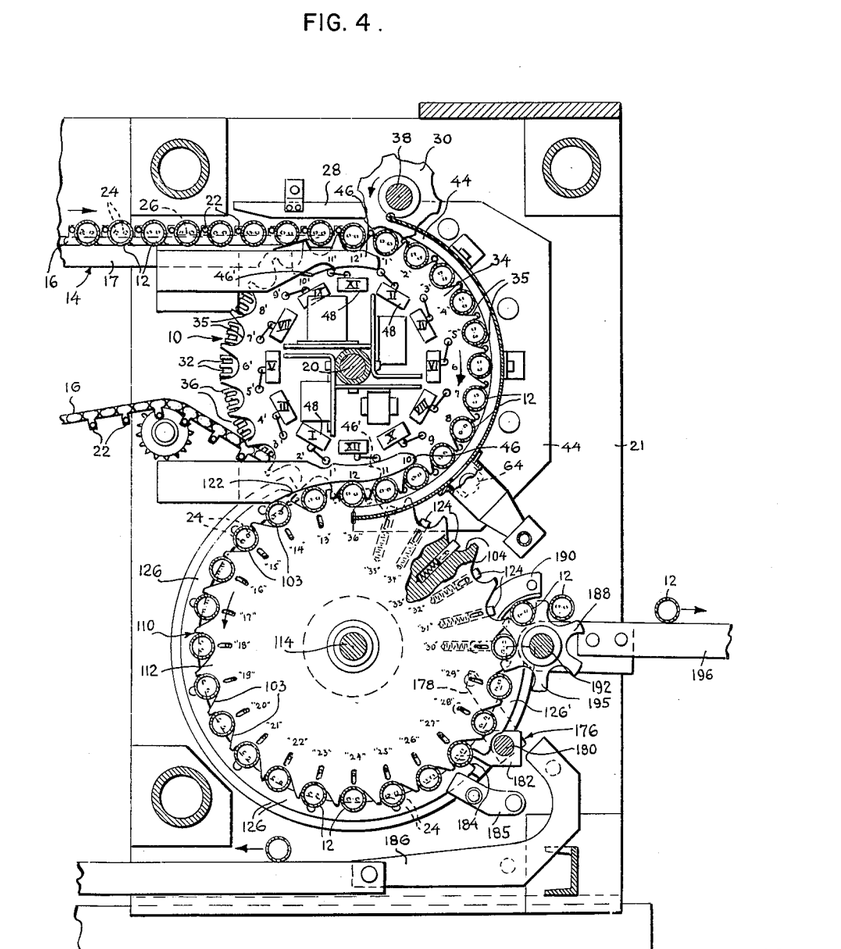
FIG. 4 is a vertical-sectional view along the line IV—IV of FIG. 3 taken in the direction of the arrows and showing the details of the essential elements of the electrical-inspection conveyor and the mechanical-inspection conveyor and showing further the discharge means employed for both the "bad" and the "good" fluorescent lamps with portions of the mechanical-inspection conveyor broken away to show the details of the heads of such mechanical-inspection conveyor.
Figure 13:
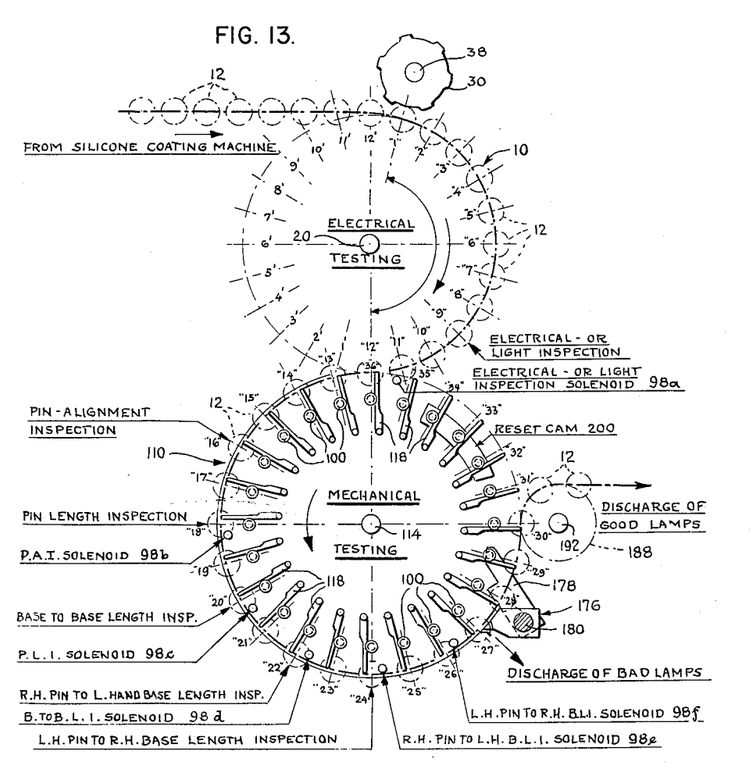
FIG. 13 is a diagrammatic side-elevational view illustrating the operation of the automatic inspection machine.

With specific reference to the form of the present invention illustrated in the drawings and referring particularly to FIGS. 3, 4 and 13 an electrical-inspection conveyor of the automatic inspection machine is indicated generally by the reference numeral 10.

In order to provide means for delivering fluorescent lamps 12 to the electrical-inspection conveyor 10 from a machine (not shown) for silicone coating the envelopes of the fluorescent lamps 12, a feeding conveyor 14 is provided. This feeding conveyor 14 (FIG. 4) comprises a pair of endless chains 16 guided by a chain track 17 and extending around and supported by sprockets 18, only one pair of which is shown in FIGS. 3 and 4. The sprockets 18 (shown in FIGS. 3 and 4) are affixed to a conveyor shaft 20 journalled in a frame 21 of the automatic inspection machine and upon which conveyor shaft 20 the electrical-inspection conveyor 10 is mounted. A second pair of sprockets (not shown) for the feeding conveyor 14 are driven by the silicone-coating machine (not shown).

Pusher pins 22, upstanding from the endless chains 16, move the fluorescent lamps 12 with their base pins 24 riding on pin tracks 26, to the right, as viewed in FIG. 4, under stationary guides 28 and to two lamp-seating wheels 30 (FIG. 3) at Station "1" (FIG. 13) of the electrical-inspection conveyor 10. These lamp-seating wheels 30 seat the base pins 24 of each individual fluorescent lamp 12 in guide slots 31 and against spring-biased electrical contacts 32 (FIGS. 5 and 6) contained in heads 36 mounted on the sprockets 18.

Electrical-Inspection Conveyor

Figure 5:
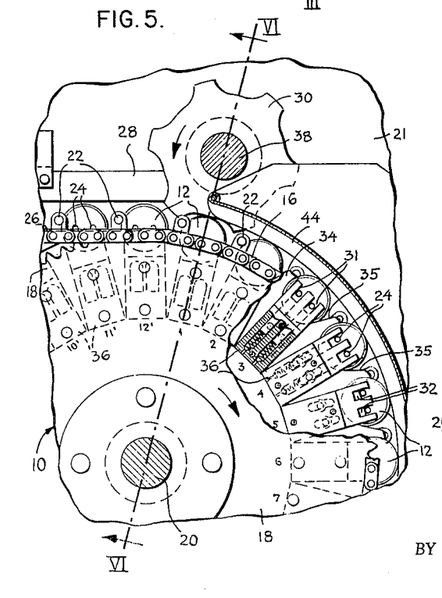
FIG. 5 is an enlarged fragmentary vertical-sectional view of a portion of FIG. 4 taken along the line V—V of FIG. 6 in the direction of the arrows and showing the electrical contact means associated with each head of the electrical-inspection conveyor.
Figure 6:
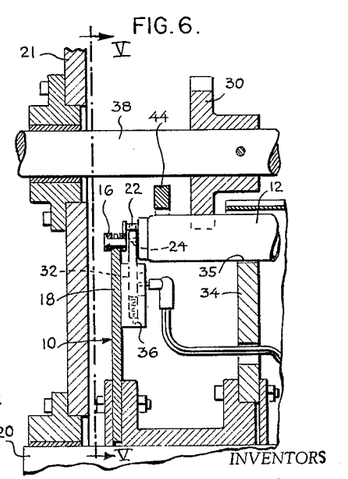
FIG. 6 is a vertical-sectional view along the line VI—VI of FIG. 5 in the direction of the arrows.

The electrical-inspection conveyor 10 comprises a pair of wheels 34 (FIG. 3) mounted on the conveyor shaft 20, with each wheel 34 having a plurality of (twenty-four as shown in FIGS. 4 and 13) peripheral lamp-supporting serrations 35 which loosely support one side of the envelope of the fluorescent lamp 12 (FIG. 6). The spring-biased electrical contacts 32 urge the other side of the envelope against a pair of peripheral retaining plates 44 (FIG. 5).

When viewed in FIGS. 4, 5 and 13 this electrical-inspection conveyor 10 is rotated continuously in clockwise direction by the sprockets 18 affixed to the conveyor shaft 20. So that the two lamp-seating wheels 30 (FIG. 3) will continuously rotate in counterclockwise direction (FIG. 4) and tangent to the path of movement of the fluorescent lamps 12 toward the electrical-inspection conveyor 10, such lamp-seating wheels 30 are affixed to a shaft 38 having a pinion 40 (FIG. 2) thereon which meshes with a gear 42 on the conveyor shaft 20.

When the fluorescent lamp 12 (FIGS. 4 and 5) on the feeding conveyor 14 moves from a position adjacent Station "11'" on the electrical-inspection conveyor 10 into registry with a head 36 at Station "12'", the base pins 24 ride off the pin tracks 26 into the guide slots 31 and onto the electrical contacts 32. At Station "1" the lamp-seating wheels 30 exert an inward radial force on the fluorescent lamp 12, thereby guiding the envelope of the fluorescent lamp 12 under the peripheral retaining plates 44 (extending from Station "1" to Station "12") and compressing the base pins 24 against the spring-biased electrical contacts 32 to form good electrical contact between the base pins 24 and the electrical contacts 32. To prevent arcing of the base pins 24 when they engage the electrical contacts 32, the fluorescent lamp 12 is not energized during its movement from a position adjacent Station "11'" to Station "1."

To prevent lamp energization during such movement one of two cut-out cams 46 and 46' (FIGS. 3 and 4) on the frame 21 opens a normally-closed switch 48 on one of the wheels 34, the switch 48 being associated with the head 36 which is to receive the lamp 12. This normally-closed switch 48 forms a part of a "lamp-energization" circuit connected to the above-mentioned head 36.

Lamp-Energization Circuits

Figure 14:
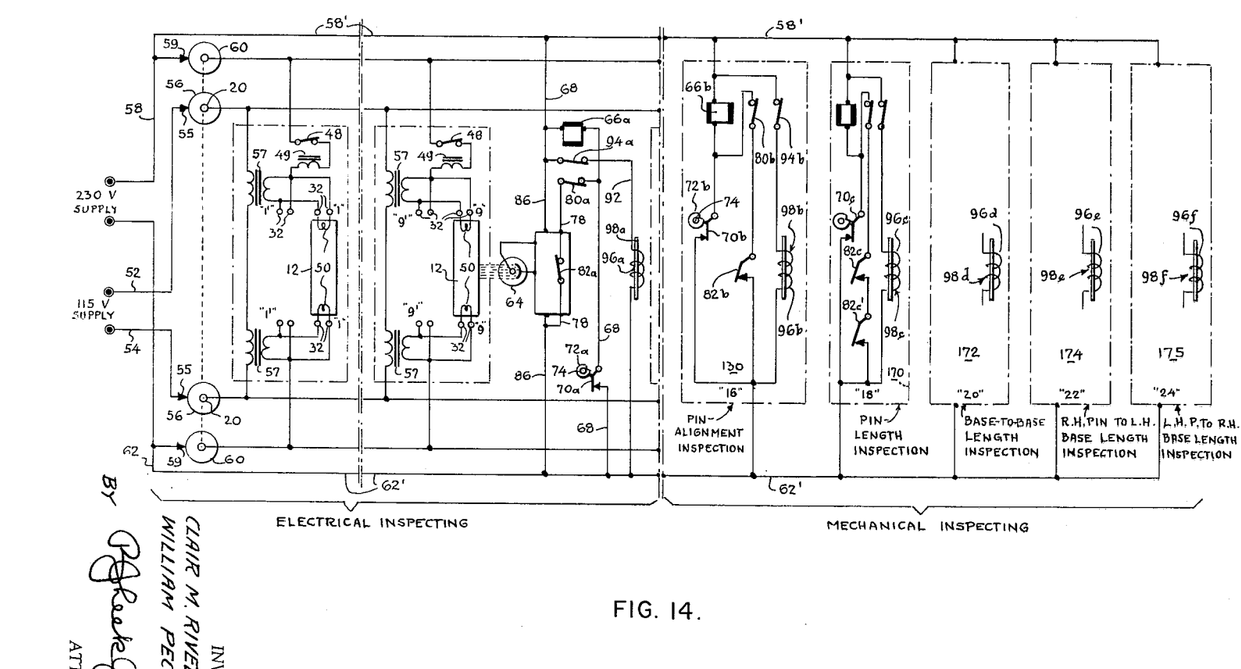
FIG. 14 is a diagrammatic view of the electrical-control elements associated with the electrical-inspection conveyor and the mechanical-inspection conveyor.

It will be appreciated that although only the "lamp-energizing" circuits at Station "1," the lamp-loading station, and Station "9," the electrical-inspection station, are shown in FIG. 14, twelve such "lamp-energizing" circuits (each containing one switch 48) are provided for use with the twenty-four heads 36. Such "lamp-energizing" circuits (FIG. 14) are connected in electrical parallel with each other. Since only one-half of the heads 36 (FIG. 4) normally contain fluorescent lamps 12, one switch 48 (for example the switch 48, identified by the Roman numeral "XI") can therefore be employed for two heads 36, namely the head 36 at Station "11" (FIG. 4) which contains a fluorescent lamp 12 and the other diametrically opposed head 36 at Station "11'" which is empty. To clarify the explanation of this switch operation, the switches 48 are provided in FIG. 4 with Roman numerals corresponding to the numerals of the stations at which their associated heads 36 are disposed.

With this structure the empty head 36 at Station "11'" (which is about to receive a fluorescent lamp 12) is deenergized as the switch 48 (carrying the identifying Roman numeral "XI") is engaged and opened by the cut-out cam 46. Such head 36 and the fluorescent lamp 12 received therein remain deenergized until the cut-out cam 46 permits reclosure of the switch 48 (carrying the identifying Roman numeral "XI") adjacent Station "1."

The fluorescent lamp 12 then remains energized until it arrives at Station "10" where one of the cut-out cams (either 46 and 46') opens the switch 48 associated with the head 36 at Station "10."

In order to provide cathode-heating means for cathodes 50 (FIG. 14) of fluorescent lamps 12 at Stations "1" through "9" a suitable voltage supply (indicated by the legend "115V Supply") is connected by line-voltage conductors 52 and 54 to brushes 55 engageable with commutators 56 on the conveyor shaft 20 (FIG. 3) and thence to transformers 57, the secondaries of which are suitably joined to the electrical contacts 32 and hence through the base pins 24 to the cathodes 50. For the purpose of applying a starting and operating voltage across the fluorescent lamps 12, one side of another suitable voltage supply (indicated by the legend "230V Supply") is connected by a line-voltage conductor 58 to a brush 59 and commutators 60 and through the now-closed switch 48 and a ballast 49 to one cathode 50. The other side of the "230V Supply" is joined by a line-voltage conductor 62 through a similar arrangement of a brush 59 and commutator 60 to the other cathode 50.

It will be understood that the electrical inspection of a fluorescent lamp 12 on the electrical-inspection conveyor 10 comprises the automatic determination of whether or not the fluorescent lamp 12 upon energization, as above-described, produces the predetermined quantity of light for which it was designed. A fluorescent lamp 12 is considered electrically "good" if it lights and produces the desired standard. To provide means for detecting wether or not the fluorescent lamp 12 (during its path of movement from Station "1" through Station "9") complies with the acceptable standard of light output, light-responsive photo-electric means, such as the photo-electric cell 64 (FIGS. 3, 4 and 14), is disposed adjacent Station "9" and forms a part of an "electrical-inspection" circuit, FIG. 14.

Electrical-Inspection Circuit

To provide an operating voltage for this "electrical-inspection" circuit (FIG. 14) a conductor 68 connects a relay 66a in series with a cam-operated switch 70a and disposes the relay 66a and cam-operated switch 70a across branch line-voltage conductors 58' and 62', which conductors 58' and 62' are connected respectively by the line-voltage conductors 58 and 62 to the "230V Supply."

This switch 70a is operated by a cam 72a, FIG. 3, mounted on a shaft 74 which is driven (by means of a chain drive 76 from the shaft 38) at a higher rate of rotation than the shaft 38, thus enabling the cam 72a to open and close the switch 70a (for a purpose as hereinafter related) during the time in which a fluorescent lamp 12 is adjacent Station "9" and the light emanating from such fluorescent lamp 12 impinges upon the photoelectric cell 64.

In order to connect a conventional control circuit for the photo-electric cell 64 (FIG. 14) to the "230V Supply," a line 86 connects such photo-electric cell 64 in electrical parallel with the relay 66a and cam-operated switch 70a. So that the relay 66a will remain energized (when the cam-operated switch 70a is momentarily opened and an electrically "good" fluorescent lamp 12 is adjacent Station "9") a line 78 connects a first normally-open contact 80a of the relay 66a in series with a normally-open switch 82a which is closable by energization of the control circuit in response to current flow through the photoelectric cell 64. This line 78 places the first normally-open contact 80a and the normally-open switch 82a in electrical parallel with the cam-operated switch 70a, thus providing a holding shunt for the relay 66a. The operating means which will ultimately cause rejection and discharge of an electrically "bad" fluorescent lamp 12 comprises a second normally-open contact 94a (of the relay 66a) connected in series with a coil 96a of an operating solenoid 98a (FIG. 13) by a conductor 92, extending from the line 86 to the branch-line voltage conductor 62' thus connecting the second normally-open contact 94a and the coil 96a to the operating voltage. The solenoid 98a is disposed adjacent Station "35" (FIG. 13) on a mechanical-inspection conveyor 110 for a purpose hereinafter explained.

"Good" Lamp Operation

It will be appreciated that as a fluorescent lamp 12 approaches Station "9" the cam-operated switch 70a (FIG. 14) remains closed, thus maintaining energization of the relay 66a with attendant closure of the normally-open contacts 80a and 94a and energization of the coil 96a of the solenoid 98a. If such fluorescent lamp 12 is lighted (and emitting the predetermined standard of light output) as it arrives at Station "9," the photo-electric cell 64 causes closure of its associated control circuit to actuate closure of the normally-open switch 82a thus energizing the relay 66a through a by-pass circuit, including now-closed contacts 80a to the relay 66a. Thereafter and for a brief period of time, the cam 72a opens the cam-operated switch 70a but since the switch 82a is closed, the relay 66a remains energized, the contact 94a remains closed and the coil 96a of the solenoid 98a at Station "35" remains energized. This "good" fluorescent lamp 12 will ultimately be discharged at Station "30" of mechanical-inspection conveyor 110 (FIG. 13).

"Bad" Lamp Operation

If however, the fluorescent lamp 12 is not lighted (or is emitting less than the predetermined standard of light output so that operation of the photo-electric cell 64 does not occur) as it passes Station "9," the normally-open switch 82a accordingly remains open. When the cam-operated switch 70a is subsequently opened by the cam 72a, the relay 66a is thereby deenergized with resultant opening the of the contact 94a and deenergization of the coil 96a of the solenoid 98a.

This deenergization of the coil 96a of the solenoid 98a at Station "35" (FIG. 13) causes the release, as hereinafter described, of a spring-biased reject pin 100 (FIGS. 2, 3, 10, 11 and 13) on a toothed memory wheel 102. Such released reject pin 100 is disposed adjacent a head 104 at Station "35" on the mechanical-inspection conveyor 110 so that when the head 104 (now at Station "33") receives the electrically "bad" fluorescent lamp 12 from the head 36 (now at Station "9") at Station "12," the released reject pin 100 will ultimately cause discharge of the electrically "bad" fluorescent lamp 12 when such damp arrives at Station "27," the bad-lamp discharge station.

Mechanical-Inspection Conveyor

Figure 2:
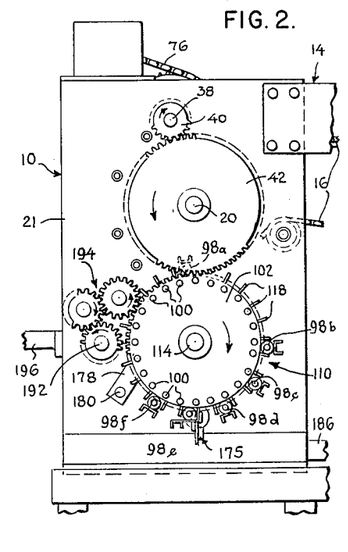
FIG. 2 is a fragmentary side-elevational view of the automatic inspection machine taken from the right-hand side of FIG. 3 and showing the drive means for the electrical and mechanical inspection conveyors.
Figure 10:
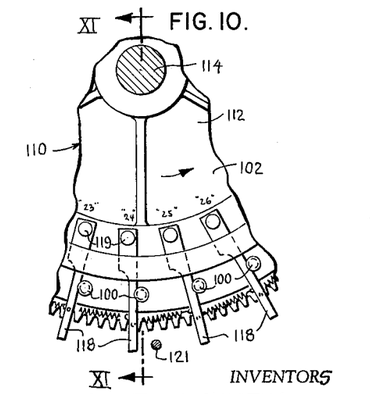
FIG. 10 is an enlarged, fragmentary vertical-sectional view taken along the line X—X of FIG. 3 in the direction of the arrows and showing the details of a memory wheel associated with the mechanical-inspection conveyor and one of the associated solenoids utilized to operate such memory wheel.

The mechanical-inspection conveyor 110 (FIGS. 2, 3, 4, and 13) is similar in structure to the electrical-inspection conveyor 10 and comprises a pair of wheels 112 mounted on a conveyor shaft 114, with each wheel 112 being provided with a plurality of peripheral serrations 103 which as shown are twenty-four in number. Each aligned pair of serrations 103 and associated plungers 124 (FIG. 4) form a head 104. To permit a fluorescent lamp 12 to gravitate from a head 36 of the electrical-inspection conveyor 10 to a head 104 of the mechanical-inspection conveyor 110 at Station "12," the lamp-transfer station (where the heads 36 and 104 are relatively stationary with respect to each other), the conveyor shaft 114 is disposed a predetermined distance below the conveyor shaft 20 and the mechanical-inspection conveyor 110 is rotated in counterclockwise direction, as viewed in FIGS. 4 and 13, in synchronism with the electrical-inspection conveyor 10. Such synchronism is achieved by meshing gear 42 (FIG. 2, on the conveyor shaft 20 for the electrical-inspection conveyor 10) with the toothed memory wheel 102 (FIGS. 2, 10 and 11) on the conveyor shaft 114. As shown in FIGS. 2 and 3, each of the twenty-four spring-biased reject pins 100 is mounted on the memory wheel 102 radially behind its associated head 104 and is held in the normally "in" or solid-line position shown in FIG. 11 by a spring-biased latching lever 118 pivoted on the memory wheel 102 at 119 (FIG. 10).

Before proceeding with the description of the operation of the apparatus following deenergization of solenoid 98a at Station "35" to cause the release of the reject pin 100, it must be first appreciated that there are similar solenoids disposed adjacent the various work stations (FIG. 13) of the mechanical-inspection conveyor 110 and that these similar solenoids are operatively associated with mechanical inspection devices, each of which inspection devices is located two work stations in back of its associated solenoid. For example, a pin-alignment inspection solenoid 98b adjacent Station "18" is associated with a pin-alignment inspection device 130 (FIG. 9) at Station "16." A pin-length inspection device 170 (FIG. 1) at Station "18" is operable to cause deenergization of a pin-length inspection solenoid 98c adjacent Station "20." A base-to-base length inspection solenoid 98d adjacent Station "22" is operatively associated with a base-to-base length inspection device 172 (FIG. 1) at Station "20." At Station "22" an inspection device 174 (FIG. 1) may deenergize a right-hand pin to left-hand base length inspection solenoid 98e (as viewed in FIG. 3) adjacent Station "24" (FIGS. 10, 11 and 13) while at Station "24" an inspection device 175 (FIG. 2) is associated with a left-hand pin to right-hand base length inspection solenoid 98f (FIG. 3) adjacent Station "26."

It will thus be understood that when a fluorescent lamp 12 is found to be electrically or mechanically bad by the above-described electrical-inspection device or the above-mentioned mechanical-inspection devices, a reject pin 100 disposed two positions or work stations ahead of the particular inspection station is released. This released reject pin 100 is then operable (as hereinafter described) when the head 104 associated with such released reject pin 100 arrives at Station "29" to actuate a bad-lamp discharge device 176 (FIG. 12) at Station "27," the bad-lamp discharge station, to permit discharge of the "bad" lamp at Station "27."

Figure 11:
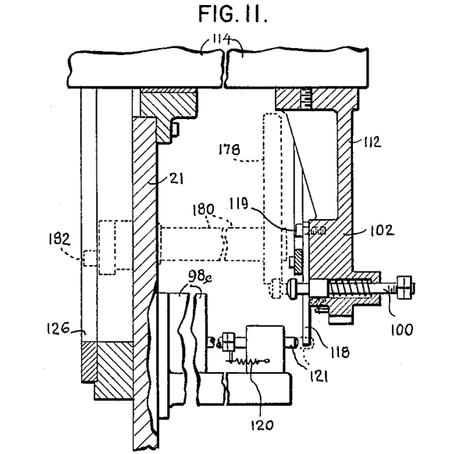
FIG. 11 is a vertical-sectional view taken along the line XI—XI of FIG. 10 in the direction of the arrows.

Since the solenoids 98a and 98e operate in identical manner to cause the release of their associated reject pins 100 two stations ahead of the associated inspection operation, an explanation of the operation of the solenoid 98e, shown in FIGS. 3 and 11, is deemed sufficient.

The coil 96e of the solenoid 98e (FIGS. 3 and 11) at Station "24" is deenergized (as hereinafter explained) when the inspection device 174 (FIG. 1) at Station "22" detects a lamp 12 having an out-of-limits distance from the right-hand base pins 24 (FIG. 3) to the opposite base. Such deenergization of the coil 96e permits a spring 120 to move the armature 121 of the solenoid 98e to the right (as shown in FIG. 11) into engagement with the latching lever 118 to move the latter out of engagement with the spring-biased reject pin 100, thus permitting such reject pin 100 to move to the left from the solid-line or "in" position to the dotted-line or "out" position shown in FIG. 11.

As a specific example of the operation of released reject pin 100, it will be appreciated that while the reject pin 100 now adjacent Station "24" is moved to this "out" position, such released reject pin 100 is operable only when it arrives at Station "29," to cause the discharge of the "bad" fluorescent lamp 12 which was responsible for actuating the reject pin 100 at Station "22," when such "bad" fluorescent lamp 12 arrives at Station "27," the bad-lamp discharge station.

In like manner any "bad" fluorescent lamp 12 at Station "9" will result in deenergization of solenoid 98a accompanied by tripping of reject pin 100 at Station "35" (FIG. 13), so that when such (Station "35") reject pins arrives at Station "29," the "bad" lamp detected at Station "9" (and which was subsequently transferred to Station "33," head 104), will be discharge at bad-lamp discharge Station "27."

As the fluorescent lamp 12 is moved from Station "9," the electrical-inspection station, to Station "12," the lamp-transfer station, the envelope of the fluorescent lamp 12 engages a stationary guide face 122 (FIG. 4) on the cut-out cam 46' and a similar guide face (not shown) on the other end of the machine. These faces 122 extend from Station "10" to Station "14," thus seating the fluorescent lamp 12 in the head 104 at Station "12," against the action of spring-biased plungers 124 (FIG. 4), normally projecting into an empty head 104. Adjacent Stations "10" through "12" one of the cut-out cams (either 46 or 46') opens the switch 48 associated with the head 36 then at Station "10" thus deenergizing the associated "electrical-energizing" circuit (FIG. 14) to prevent arcing of the base pins 24 as the fluorescent lamp 12 is transferred by gravity from the head 36 to the head 104 at the transfer Station "12."

Hence, as the fluorescent lamp 12 is moved by the head 104 to Station "13," the envelope of the fluorescent lamp 12 is securely held against the guide faces 122 by the plungers 124 with the base pins 24 in the same position determined by the guide slots 31, electrical contacts 32 and envelope retaining plates 44, thus enabling the base pins 24 on each end of the fluorescent lamp 12 to ride onto retaining tracks or pin tracks 126 (FIG. 4), extending peripherally from adjacent Station "13" to Station "27," the bad-lamp discharge station, where such pin tracks 126 are interrupted to permit the discharge of "bad" fluorescent lamps 12. Continuations 126' of the pin tracks 126 however, extend from Station "27" to Station "30," the good-lamp discharge station.

Figure 7:
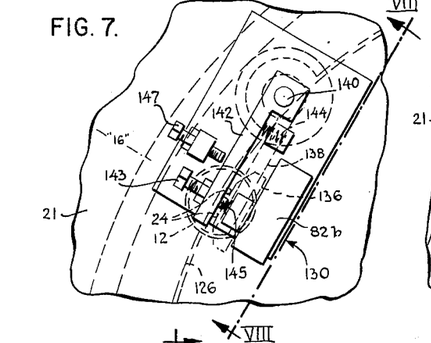
FIG. 7 is an enlarged, fragmentary view of a portion of FIG. 1 showing the first mechanical-inspection device located at the pin-alignment inspection station in operative engagement with a fluorescent lamp.

Although it is obvious that both electrically "good" and "bad" fluorescent lamps 12 are subject to all automatic mechanical inspections performed on the mechanical-inspection conveyor 110, for purposes of illustration it will be assumed that an electrically "good" fluorescent lamp 12 has been transferred to the head 104 of the mechanical-inspection conveyor 100. When the head 104 and the electrically "good" fluorescent lamp 12 carried thereby arrive at Station "16," the pin-alignment inspection station, the planar alignment of the base pins 24 at each end of the fluorescent lamp 12 is automatically inspected by a pin-alignment gauge 130 (FIGS. 7-9).

*Pin-Alignment Inspection*

Figure 8:
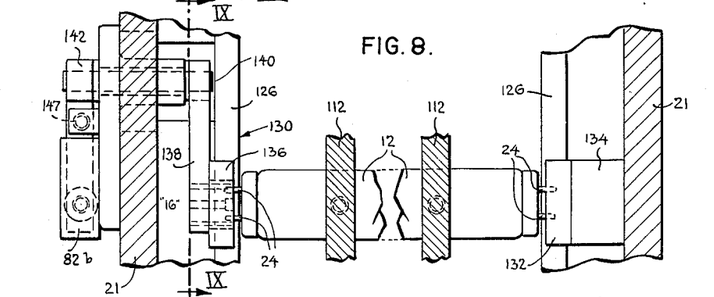
FIG. 8 is a longitudinal-sectional view taken along the line VIII—VIII of FIG. 7 in the direction of the arrows.
Figure 9:
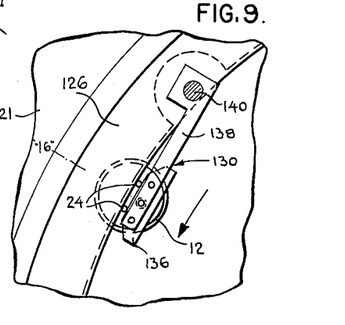
FIG. 9 is a vertical-sectional view taken along the line IX—IX of FIG. 8 in the direction of the arrows and showing the pin-alignment gauging shoe.

Referring now more specifically to FIG. 8, it will be noted that as the base pins 24 on the opposite ends of fluorescent lamp 12 move along the pin tracks 126 (from the top to the bottom of FIG. 8) the right-hand pair of base pins 24 ride under a stationary shoe 132 affixed by means of a bracket 134 to the frame 21 of the automatic-inspection machine. This stationary shoe 132 maintains the right-hand base pins 24 against the right-hand pin track 126. Simultaneously therewith the left-hand pair of base pins 24 engage a gauging shoe 136 which is affixed to an arm 138 (FIG. 8) carried by the right-hand end of a shaft 140 rotatable in the frame 21. To provide a switch-operating means for a movable contact 145 of a switch 82b (FIGS. 7, 8 and 14), an operating arm 142 is mounted on the left-hand end of the shaft 140 (FIG. 8) and an adjustable operating finger 143 carried by the arm 142 is biased by means of a spring 144 away from the movable contact 145 of the switch 82b (FIGS. 7, 8 and 14), which switch 82b is mounted adjacent the operating finger 143, as viewed in FIG. 7. Since arm 142 is affixed to shaft 140 which carries arm 138, such spring 144 thus also biases the shoe arm 138 and the gauging shoe 136 carried thereby downwardly into engagement with the left-hand pair of base pins 24. To limit the thrust of the spring 144 (FIG. 7) away from the movable contact 145, an adjustable stop 147 is provided adjacent the operating arm 142.

It will be appreciated that if the left-hand pair of base pins 24 (FIG. 8) lie in a plane which is disposed at an angle with respect to the plane of the right-hand pair of base pins 24, (and such angle is greater than a predetermined specified angle) the left-hand base pins will raise the gauging shoe 136, the shoe arm 138, the operating arm 142 and the movable contact 145 of the switch 82b away from the plane of the pin tracks 126 with attendant opening of the switch 82b thus rendering a "pin-alignment inspection" circuit (FIG. 14) inoperative.

*Pin-Alignment Inspection Circuit*

Since the "pin-alignment inspection" circuit (FIG. 14) is similar to the aforementioned "electrical-inspection" circuit in structure and operation, it is deemed sufficient to briefly describe the former.

A relay 66b in the "pin-alignment inspection" circuit is connected in series with a cam-operated switch 70b and such relay 66b and cam-operated switch 70b are disposed across the branch line-voltage conductors 58' and 62'. The switch 82b and an associated first normally-open contact 80b of the relay 66b provide a holding shunt disposed in parallel with the cam-operated switch 70b. A second normally-open contact 94b of such relay 66b is connected in electrical series with a coil 96b of the solenoid 98b (disposed adjacent Station "18"), with such coil 96b being connected in parallel with the relay 66b and the cam-operated switch 70b.

When the pin alignment of a fluorescent lamp 12 passing through the pin-alignment inspection Station "16," exceeds the predetermined specified limit, the switch 82b is opened by operation of the above-described pin-alignment inspection device 130 with the result that when a cam 72b (FIG. 14) on the shaft 74 (FIG. 3) momentarily opens the cam-operated switch 70b, the relay 66b is deenergized, the second normally-open contact 84b is resultantly opened, and the coil 96b of the solenoid 98b adjacent Station "18" is deenergized. This deenergization of the solenoid 98b permits the release of the reject pin 100 at Station "18" and causes the attendant movement of such reject pin 100 from a position similar to the solid-line or "in" position shown in FIG. 11 to a position similar to the dotted-line or "out" position shown in such figure. In this released dotted-line position the reject pin 100 will ultimately cause the discharge of the mechanically "bad" fluorescent lamp 12 (now at Station "16") at Station "27," the bad-lamp discharge station, as hereinafter related.

Figure 1:
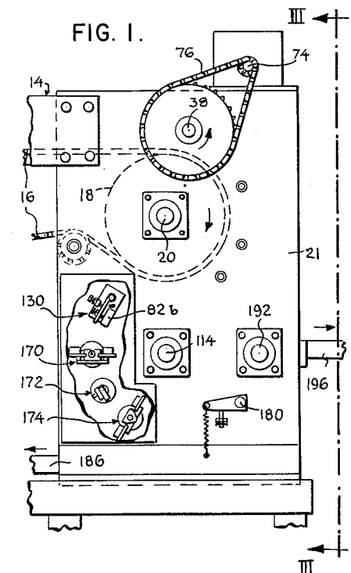
FIG. 1 is a fragmentary side-elevational view of an automatic inspection machine for fluorescent lamps, taken from the left-hand side of FIG. 3 and with portions thereof broken away to show some of the mechanical inspection devices associated with such automatic inspection machine.

For illustrative purposes it will be further assumed that a head 104 approaching Station "18," the pin-length inspection station, carries an electrically "good" and heretofore mechanically "good" fluorescent lamp 12. At Station "18" the length of the base pins 24 on each end of the fluorescent lamp 12 is inspected by a pin-length inspection device 170 (FIG. 1).

*Pin-Length Inspection*

This pin-length inspection gauge 170 is similar to the pin-alignment inspection gauge 130 but utilizes in its associated "pin-length inspection" circuit (FIG. 14) two switches 82c and 82c' in the holding shunt for a cam-operated switch 70c, rather than the single switch 82b employed in the holding shunt for the cam-operated switch 70b in the "pin-alignment inspection" circuit.

When, for example, the length of the base pins 24 at either end of the fluorescent lamp 12 exceeds the maximum specified length, the switch 82c is opened. In the case where the length of any of the base pins 24 is below the minimum specified length the switch 82c' is opened. In either case (or in both cases) the coil 96c of the solenoid 98c at Station "20' is deenergized and the reject pin 100 associated with the head 104 at Station "20" is released to a position similar to the dotted-line position shown in FIG. 11 to ultimately cause, as hereinafter described, the discharge (at Station "27," the bad-lamp discharge station) of the mechanically "bad" fluorescent lamp 12.

*Further Mechanical Inspection*

Thereafter, the fluorescent lamp 12 carried by the head 104 is inspected at Station "20," the base-to-base length inspection station (FIG. 13) by an inspection device 172 (FIG. 1) having an associated "base-to-base length inspection" circuit (FIG. 14), which circuit is similar to the above-described "pin-length inspection" circuit. If the base-to-base length exceeds the maximum specified length or is less than the minimum specified length, the coil 96d (FIG. 14) of the solenoid 98d is deenergized and the reject pin 100 at Station "22" is released.

Figure 12:
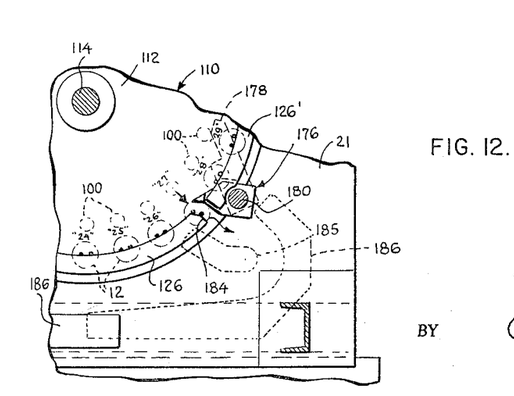
FIG. 12 is an enlarged, fragmentary vertical-sectional view of a portion of FIG. 4 adjacent the bad-lamp discharge station and showing the discharge of a "bad" lamp thereat.

At Station "22," the distance from the right-hand base pins 24, as viewed in FIG. 3, to the opposite base is inspected by an inspection device 174 (FIG. 1). Further, at Station "24," the distance from the left-hand base pins 24 (FIG. 3) to the right-hand base is inspected by an inspection device 175 (FIG. 2) which is essentially identical to the device 174. In either case if the two distances exceed or are less than the specified distances, the coils 96e and 96f (FIG. 14) of the solenoids 98e and 98f respectively (FIG. 13) are deenergized with resultant release of the reject pins 100 at Stations "24" and "26" respectively to cause discharge (at Station "27," the bad-lamp discharge station) of the mechanically "bad fluorescent lamps 12. At Station "27" the released pins 100 actuate a bad-lamp discharge device 176 (FIG. 12).

*Bad-Lamp Discharge*

For purposes of illustration, it will be assumed that a head 104 approaching Station "27" (FIGS. 12 and 13) carries either an electrically "bad" or a mechanically "bad" fluorescent lamp 12. As a result the reject pin 100 adjacent the head 104 two stations in advance, namely, that approaching Station "29" is in the released or "out" position similar to the dotted-line position shown in FIG. 11. The released reject pin 100 at Station "29" engages a gate-operating lever 178 (FIGS. 11 and 12) affixed to a shaft 180 and rotates such gate-operating lever 178 in clockwise direction, as viewed in FIG. 12. Rotation of the gate-operating lever 178 causes similar rotation of a pair of gates 182 on the shaft 180 from their "closed" position (FIG. 4) to the "open" position shown in FIG. 12. These gates 182 normally serve as track extensions between the pin tracks 126 and the continuations 126' thereof.

When either the electrically "bad" or the mechanically "bad" fluorescent lamp 12 carried by the head 104 arrives adjacent the now open gates 182, the base pins 24 gravitate down the end surfaces 184 (FIG. 12) on the pin tracks 126 along guides 185 and down a discharge chute 186 to a collecting means (not shown).

Meanwhile "good" fluorescent lamps 12 are transported by the heads 104 beyond the gates 182 since the latter are not opened by any pins 100, to Station "30" (FIGS. 4 and 13), the good-lamp dicsharge station, where take-out wheels 188 (FIGS. 4 and 13), aided by stationary arcuate guides 190 disposed adjacent Station "30," on the frame 21, cause the discharge of the "good" fluorescent lamps 12 from the heads 104.

*Good-Lamp Discharge*

These take-out wheels 188 are mounted on a shaft 192 (FIGS. 2, 3, 4 and 13), which is rotated in clockwise direction, as viewed in FIG. 4, by a gear train 194 (FIG. 2) driven from the toothed memory wheel 102. At Station "30" a head 195 on the take-out wheels 188 (moving at the same speed of rotation as the head 104 on the mechanical-inspection conveyor 110 and hence momentarily relatively stationary with respect thereto) moves the "good" fluorescent lamp 12 out of the head 104, against the arcuate guides 190 and discharges such lamp 12 onto a platform 196.

Adjacent Stations "32" through "34" a reset cam 200 (FIG. 13) returns any released reject pin 100 to its "in" or solid-line position as shown in FIG. 11, preparatory for the next cycle of operation.

It will be recognized by those skilled in the art that the objects of the present invention have been achieved by providing apparatus which is operable to automatically inspect the electrical properties of fluorescent lamps on one inspection conveyor and will then automatically inspect the mechanical properties of such fluorescent lamps on a second inspection conveyor, without the use of manual labor or automatic devices to transfer the fluorescent lamps between the successive inspection conveyors.

While in accordance with the patent statutes one preferred embodiment of the present invention has been illustrated and described in detail it is to be particularly understood that the invention is not limited thereto or thereby.

We claim:

1. Apparatus for inspecting the electrical and mechanical properties of a fluorescent lamp having base pins extending from each end thereof, said apparatus comprising a first lamp-receiving means operable to receive a lamp at a lamp-receiving position, drive means connected to said first lamp-receiving means for moving the latter and said lamp carried thereby from said lamp-receiving position through a work station to a lamp-transfer position where the force of gravity causes said lamp to drop from said first lamp-receiving means, a first lamp-retaining means disposed along the path of movement of said first lamp-receiving means and said lamp from the lamp-receiving position to the lamp-transfer position, electrical-contact means on said first lamp-receiving means for engaging said base pins and for forcing said lamp against said first lamp-retaining means, said contact means also being operable to cause energization and lighting of said lamp, light-responsive means disposed adjacent said work station for inspecting the light output of said lamp and operable to cause rejection of a defective lamp, a second lamp-receiving means disposed beneath said first lamp-receiving means, coupling means for connecting said drive means to said second lamp-receiving means and for moving the latter at the same velocity as said first lamp-receiving means and into lamp-receiving position in registry with said first lamp-receiving means at said lamp-transfer position thereby permitting said partially inspected lamp to drop into said second lamp-receiving means at said lamp-transfer position, said second lamp-receiving means and said partially inspected lamp carried thereby being moved by said drive means and said coupling means from said lamp-transfer position through a second work station to a lamp-discharge position, a second lamp-retaining means disposed along the path of movement of said second lamp-receiving means and said partially inspected lamp from the lamp-transfer position to the lamp-discharge position, a lamp-biasing means on said second lamp-receiving means for forcing the base pins of said partially inspected lamp against said second lamp-retaining means and a mechanical-inspecting means at said second work station for inspecting a mechanical property of said partially inspected lamp and operable to cause rejection of a defective lamp.

2. Apparatus for inspecting the electrical and mechanical properties of a fluorescent lamp having base pins extending from each end thereof, said apparatus comprising a first lamp-receiving means operable to receive a lamp at a lamp-receiving position, drive means connected to said first lamp-receiving means for moving the latter and said lamp carried thereby from said lamp-receiving position through a work station to a lamp-transfer position where the force of gravity causes said lamp to drop from said first lamp-receiving means, a first lamp-retaining means disposed along the path of movement of said first lamp-receiving means and said lamp from the lamp-receiving position to the lamp-transfer position, electrical-contact means on said first lamp-receiving means for engaging said base pins and for forcing said lamp against said first lamp-retaining means, said contact means also being operable to cause energization and lighting of said lamp, light-responsive means disposed adjacent said work station for inspecting the light output of said lamp, a second lamp-receiving means disposed beneath said first lamp-receiving means, coupling means for connecting said drive means to said second lamp-receiving means and for moving the latter at the same velocity as said first lamp-receiving means and into lamp-receiving position in registry with said first lamp-receiving means at said lamp-transfer position thereby permitting said partially inspected lamp to drop into said second lamp-receiving means at said lamp-transfer position, memory means disposed adjacent said second lamp-receiving means and operable by said light-responsive means when a defective lamp is detected to move to a bad-lamp rejection position, said second lamp-receiving means and said partially inspected lamp carried thereby being moved by said drive means from said lamp-transfer position through a second work station to a lamp-discharge position, a second lamp-retaining means disposed along the path of movement of said second lamp-receiving means and said partially inspected lamp from the lamp-transfer position to the lamp-discharge position, a lamp-biasing means on said second lamp-receiving means for forcing the base pins of said partially inspected lamp against said second lamp-retaining means and a mechanical-inspecting means at said second work station for inspecting a mechanical property of said partially inspected lamp and operable to move said memory means to the bad-lamp rejection position when a defective lamp is detected.

3. Apparatus for inspecting the electrical and mechanical properties of a fluorescent lamp having base pins extending from each end thereof, said apparatus comprising a first lamp-receiving means operable to receive a lamp at a lamp-receiving position, drive means connected to said first lamp-receiving means for moving the latter and said lamp carried thereby from said lamp-receiving position through a work station to a lamp-transfer position where the force of gravity causes said lamp to drop from said first lamp-receiving means, a first lamp-retaining means disposed along the path of movement of said first lamp-receiving means and said lamp from the lamp-receiving position to the lamp-transfer position, electrical-contact means on said first lamp-receiving means for engaging said base pins and for forcing said lamp against said first lamp-retaining means, said contact means also being operable to cause energization and lighting of said lamp, light-responsive means disposed adjacent said work station for inspecting the light output of said lamp, a second lamp-receiving means disposed beneath said first lamp-receiving means, coupling means for connecting said drive means to said second lamp-receiving means and for moving the latter at the same velocity as said first lamp-receiving means and into lamp-receiving position in registry with said first lamp-receiving means at said lamp-transfer position thereby permitting said partially inspected lamp to drop said second lamp-receiving means at said lamp-transfer position, memory means disposed adjacent said second lamp-receiving means and operable by said light-responsive means when a defective lamp is detected to move to a bad-lamp rejection position, said second lamp-receiving means and said partially inspected lamp carried thereby being moved by said drive means and said coupling means from said lamp-transfer position through a second work station to a lamp-discharge position, a second lamp-retaining means disposed along the path of movement of said second lamp-receiving means and said partially inspected lamp from the lamp-transfer position to the lamp-discharge position, a lamp-biasing means on said second lamp-receiving means for forcing said partially inspected lamp against said second lamp-retaining means, a mechanical-inspecting means at said second work station for inspecting a mechanical property of said partially inspected lamp and operable to move said memory means to the bad-lamp rejection position when a defective lamp is detected and bad-lamp discharge means at the lamp-discharge position operable by the memory means when the latter is in the bad-lamp rejection position to permit the discharge of a defective lamp.

4. Apparatus for inspecting the electrical and mechanical properties of a fluorescent lamp having base pins extending from each end thereof, said apparatus comprising a first wheel-type conveyor provided with a first lamp-receiving head operable to receive a lamp at a lamp-receiving position, lamp-feeding means for delivering lamps to said first head and connected to said first head for moving said first head and said lamp carried thereby from said lamp-receiving position through a work station to a lamp-transfer position where the force of gravity causes said lamp to drop from said first head, a first lamp-retaining means disposed along the path of movement of said first head and said lamp from the lamp-receiving position to the lamp-transfer position, electrical-contact means on said first head for engaging said base pins and for forcing said lamp against said first lamp-retaining means, said contact means also being operable to cause energization and lighting of said lamp, light-responsive means disposed adjacent said work station for inspecting the light output of said lamp, a second wheel-type conveyor disposed beneath said first conveyor and provided with a second lamp-receiving head, coupling means for connecting said feeding means to said second conveyor and for moving said second head at the same velocity as said first head and into lamp-reciving position in registry with said first head at said lamp-transfer position thereby permitting said partially inspected lamp to drop into said second head at said lamp-transfer position, memory means disposed adjacent said second head and operable by said light-responsive means when a defective lamp is detected to move to a bad-lamp rejection position, said second head and said partially inspected lamp carried thereby being moved by said feeding means and said coupling means from said lamp-transfer position through a second work station and a bad-lamp discharge position to a lamp-discharge position, a second lamp-retaining means disposed along the path of movement of said second head and said partially inspected lamp from the lamp-transfer position to the lamp-discharge position, a lamp-biasing means on said second head for forcing said partially inspected lamp against said second lamp-retaining means, a mechanical-inspecting means at said second work station for inspecting a mechanical property of said partially inspected lamp and operable to move said memory means to the bad-lamp rejection position when a defective lamp is detected, bad-lamp discharge means at the bad-lamp discharge position operable by the memory means when the latter is in the bad-lamp rejection position to permit the discharge of a defective lamp and lamp-discharge means adjacent said lamp-discharge position for removing the good lamps from said second head.

5. Apparatus for separately inspecting a plurality of characteristics of a lamp or the like, and after all inspections for discharging all bad lamps which fail to pass any one of the separate inspections, said apparatus comprising:
  (a) a lamp conveyor carrying a plurality of lamp receiving heads each adapted to receive and carry a lamp through a predetermined inspection path;
  (b) a plurality of memory means each affixed to and traveling with said conveyor, one of each of said memory means operatively associated with a predetermined head on said conveyor and operable to receive and record a bad lamp signal;
  (c) first inspection means operable first to test a characteristic of each lamp carried by each said conveyor-carried head, and in the case of a bad lamp, to transmit a bad lamp signal to the said memory means which is operatively associated with the said conveyor-carried head which carries the lamp then being tested by said first inspection means;
  (d) second inspection means operable to test another characteristic of each lamp carried by each said conveyor-carried head, and in the case of a bad lamp, to transmit a bad lamp signal to the said memory means which is operatively associated with the said conveyor-carried head which carries the lamp then being tested by said second inspection means; and
  (e) bad lamp ejecting means positioned proximate to the path of movement of said conveyor-carried heads and operable to eject any bad lamps from said conveyor-carried heads when moved proximate thereto, and said bad lamp ejecting means actuatable by the said memory means operatively associated with the said conveyor-carried head then moved proximate to said bad lamp ejecting means in response to any bad lamp signal previously received by such operatively associated memory means from any of said plurality of lamp inspection means.

6. Apparatus for separately inspecting a plurality of characteristics of a lamp or the like, and after all inspections for discharging all bad lamps which fail to pass any one of the separate inspections, said apparatus comprising:
  (a) a first lamp conveyor carrying a plurality of lamp receiving heads each adapted to receive and carry a lamp through a predetermined inspection path;
  (b) a second lamp conveyor carrying a plurality of lamp receiving heads each adapted to receive and carry a lamp through a predetermined inspection path;
  (c) synchronizing means for synchronizing the movement of said first conveyor and said second conveyor so that any one head carried on said first conveyor moves in predetermined relative motion with respect to a predetermined head carried on said second conveyor;
  (d) transfer means for individually and sequentially transferring lamps from each said first-conveyor-carried head to a predetermined head carried on said second conveyor;
  (e) a plurality of memory means each operatively associated with a predetermined head on said second conveyor and operable to receive and record a bad lamp signal;
  (f) first inspection means operable first to test a characteristic of each lamp carried by each said first-conveyor-carried head, and in the case of a bad lamp, to transmit a bad lamp signal to the said memory means which is operatively associated with the said second-conveyor-carried head which is later to receive from said first conveyor via said transfer means the individual lamp then being tested by said first inspection means;
  (g) second inspection means operable to test another characteristic of each lamp carried by each said second-conveyor-carried head, and in the case of a bad lamp, to transmit a bad lamp signal to the said memory means which is operatively associated with the said second-conveyor-carried head which carries the lamp then being tested by said second inspection means; and
  (h) bad lamp ejecting means positioned proximate to the path of movement of said second-conveyor-carried heads and operable to eject any bad lamps from said second-conveyor-carried heads when moved proximate thereto, and said bad lamp ejecting means actuatable by the said memory means operatively associated with the said second-conveyor-carried head then moved proximate to said bad lamp ejecting means in response to any bad lamp signal previously received by such operatively associated memory means from any of said plurality of lamp inspection means.

7. The apparatus as specified in claim 6, wherein said first inspection means comprises an electrical inspection means for testing the electrical characteristics of lamps being tested, and said second inspection means comprises a mechanical inspection means for testing the mechanical characteristics of lamps being tested.

8. The apparatus as specified in claim 7, wherein said second inspection means comprises a plurality of mechanical inspection devices for sequentially testing the mechanical characteristics of lamps being tested.

9. The apparatus as specified in claim 6, wherein said first conveyor is positioned above said second conveyor, and said transfer means effects a transfer of lamps by means of gravity from heads carried on said first conveyor to heads carried on said second conveyor.

10. The apparatus as specified in claim 6, wherein each said memory means comprises a spring-biased rod normally retained in such position as not to actuate said bad lamp ejecting means, and said lamp inspection means when measuring a bad lamp each generating an electrical signal acting to release said spring-biased rod to permit said rod to move into such position as to actuate said bad lamp ejecting means.

11. The apparatus as specified in claim 6, wherein good lamp take-out means is positioned proximate to said second conveyor, and said good lamp take-out means is operable to remove good lamps remaining on said second-conveyor-carried heads after bad lamps have been removed from said second-conveyor-carried heads by said bad lamp ejecting means.

References Cited in the file of this patent

UNITED STATES PATENTS

| | | |
|---|---|---|
| 2,315,287 | Holloway | Mar. 30, 1943 |
| 2,321,191 | Elmendorf | June 8, 1943 |
| 2,525,050 | Spicer | Oct. 10, 1950 |
| 2,767,675 | McGowan | Oct. 23, 1956 |
| 3,032,191 | Clukey | May 1, 1962 |